United States Patent

Gilson et al.

[15] 3,656,002

[45] Apr. 11, 1972

[54] SWITCHING CIRCUIT

[72] Inventors: Russell A. Gilson, Oakhurst; William F. Kiss, West Allenhurst; Vincent J. Organic, Neptune, all of N.J.

[73] Assignee: The United States of America as represented by the Secretary of the Army

[22] Filed: Nov. 24, 1970

[21] Appl. No.: 92,487

[52] U.S. Cl. ..............................307/235, 307/254, 307/244, 330/30 D

[51] Int. Cl. ..............................H03k 17/60

[58] Field of Search ..............................307/244, 241, 235, 254; 330/30 D, 69

[56] References Cited

UNITED STATES PATENTS 3,512,096 5/1970 Nagata et al. ..............................330/30 D
3,182,202 5/1965 Hesketh ..............................307/244
3,260,952 7/1966 Kaye et al. ..............................330/69
3,473,139 10/1969 Legler ..............................330/30 D
2,923,838 2/1966 Slobodzinski ..............................307/235
3,241,078 3/1966 Jones ..............................330/69

*Primary Examiner*—Donald D. Forrer
*Assistant Examiner*—Harold A. Dixon
*Attorney*—Harry M. Saragovitz, Edward J. Kelly, Herbert Berl and Daniel D. Sharp

[57] ABSTRACT

A switching circuit for providing maximum isolation between a radio frequency source and a load when the circuit is in a first operating condition and for delivering substantially maximum energy from said source to said load when the circuit is in a second operating condition, while presenting a substantially constant impedance to the source during both operating conditions, whereby the load is always matched to the source.

12 Claims, 6 Drawing Figures

INVENTORS,
RUSSELL A. GILSON,
WILLIAM F. KISS &
VINCENT J. ORGANIC

BY: Daniel D. Sharp,
Harry M. Saragovitz,
Edward J. Kelly & Herbert Berl
ATTORNEYS

INVENTORS,
RUSSELL A. GILSON,
WILLIAM F. KISS &
VINCENT J. ORGANIC

BY: Daniel D. Sharp,
Harry M. Saragovitz
Edward J. Kelly & Herbert Berl
ATTORNEYS

SWITCHING CIRCUIT

The invention described herein may be manufactured, used and licensed by or for the Government for governmental purposes without the payment to us of any royalty thereon.

In some switching applications, it is desirable to deliver maximum energy from an RF source to a load impedance when the switch is in the on condition and to deliver a minimum of energy to the load when the switch is off, while maintaining a constant impedance to the RF source in order to minimize reflections. Prior means for achieving a reasonable on-off power ratio are available; however, such means have the serious disadvantage that the load impedance presented to the source is not constant for both on and off conditions of the switching means.

In accordance with the invention, the signal from the source is applied to a signal transistor which has in its output circuit a pair of transistor switches which conduct to the exclusion of the other. The first of these transistor switches is connected in series with the load and, when conducting, acts as a switch to transfer energy from the output of the signal transistor to the load through an appropriate coupling capacitor. When a control input is applied to the circuit, the first transistor switch is rendered conducting or closed, while the other transistor switch is nonconducting or open. In the absence of a control input, the second of the transistor switches is rendered conducting (closed) and the first transistor switch is turned off (opened). This second transistor switch is connected across the output of the signal transistor and the load and then presents essentially a short circuit to said load, thereby isolating the load from the signal source.

In either condition of the circuit, it will be noted that the signal source looks into the same input impedance, namely, the impedance offered by the signal transistor.

Figure 1:
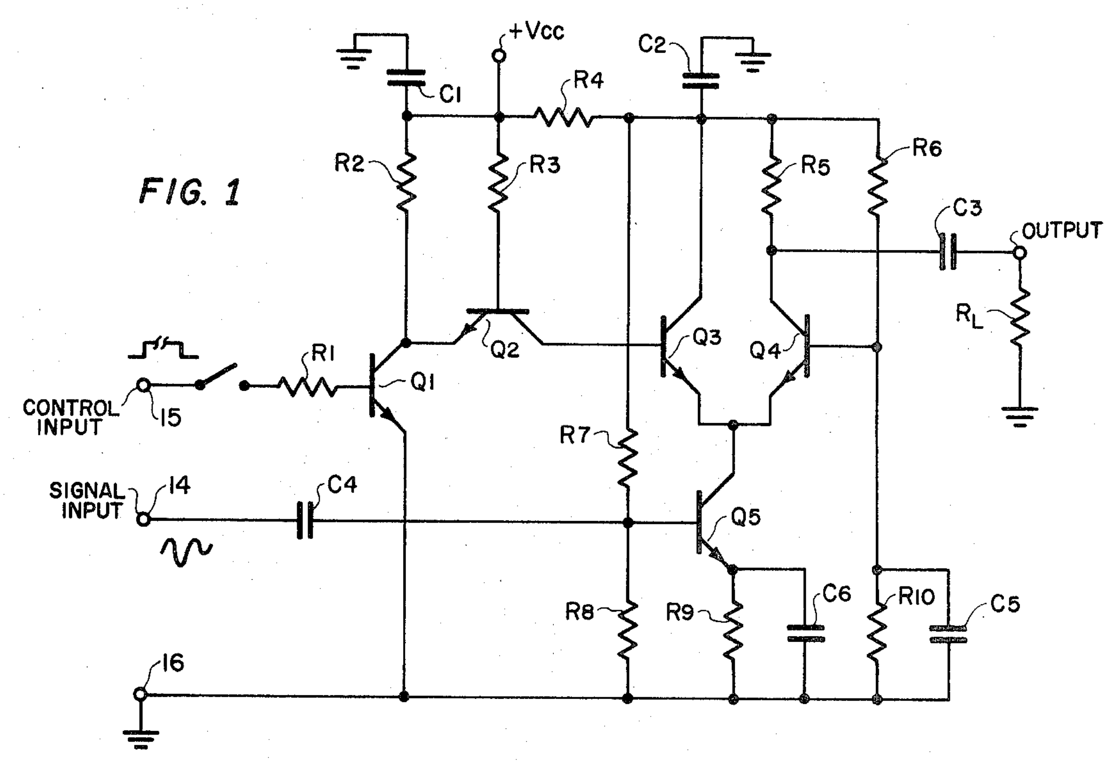
FIG. 1 is a circuit diagram of a switching circuit according to the invention.

Referring to FIG. 1, with no positive control input signal applied between the control input terminals 15 and 16, the npn transistor Q1 is cut off. The base-emitter junction of transistor Q2 cannot pass current since the path through the nonconducting transistor Q1 to ground is open. The base-collector junction of transistor Q2 is forward biased. The base of transistor Q3, which combines with transistor Q4 to form an emitter-coupled pair, is at a potential differing from the supply potential $+V_{cc}$ only by the voltage drop across the biasing resistor R3 for transistor Q2 and the forward drop of about 0.7 volt at the base-collector junction of transistor Q2. The base-emitter bias of transistor Q4 is maintained somewhat less positive than that of transistor Q3 by the amount of the voltage drop across resistor R10; the latter is part of a voltage divider network including resistors R4 and R6. The capacitor C5 across biasing resistor R10, serves as a bypass capacitor. In the absence of a control input signal, it is necessary only that the voltage on the base of transistor Q4 be slightly less positive than the voltage on the base of transistor Q3 to insure that Q3 is conducting and Q4 is nonconducting.

The RF signal at terminals 14 and 16 is coupled through capacitor C4 to the base of transistor Q5. A voltage divider network comprising resistors R4, R7 and R8 is connected across the voltage supply, with the potential drop across resistor R8, establishing a suitable bias for transistor Q5 in the active linear region. The capacitor C6 bypasses the biasing resistor R9.

The resistor R4 in the collector of transistor Q3 provides a voltage drop sufficient to make the collector voltage at Q3 lower than the voltage at the base of transistor Q3. If it were not for the presence of resistor R4, the collector voltage in transistor Q3 would always be at the supply voltage. By insuring that the collector voltage is less positive than the base voltage, transistor Q3 will operate in the saturation or low impedance region in the absence of a control input.

Since the npn transistor Q3 is biased more positively than the npn transistor Q4, the sole path for flow of collector current of transistor Q5 is through transistor Q3. Consequently, the input signal cannot be supplied to the output terminals across which the load $R_L$ is connected. It should be noted that the heavily conducting transistor Q3 acts as a closed switch with the collector of transistor Q3 being effectively coupled to ground, for alternating current purposes by means of capacitor $C_2$. Capacitor C1 serves as a conventional by-pass capacitor to keep alternating currents out of the power supply.

Figure 2:
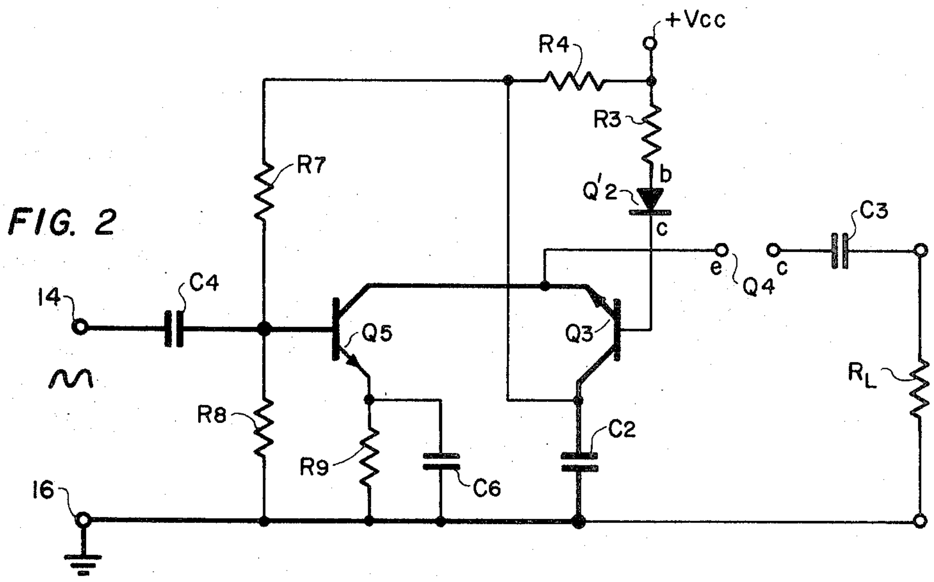
FIG. 2 is a simplified version of the circuit of FIG. 1 with no control input signal.
Figure 3:
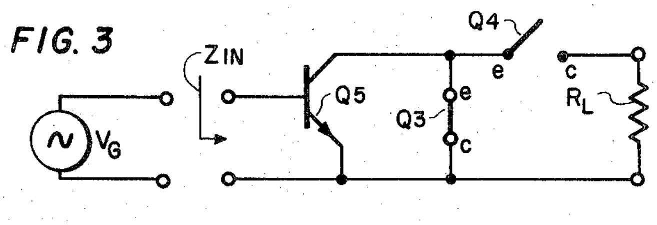
FIG. 3 is a simplified representation of the circuit illustrated in FIG. 2.

The effective signal portion of the circuit of FIG. 1, during the absence of a control input at control terminals 15 and 16 is indicated in FIG. 2. As indicated in FIG. 2, in heavy lines, the alternating current input signal at terminals 14 and 16 is coupled by capacitor C4 through the base of transistor Q5, whose emitter is connected to a-c ground by way of by-pass capacitor C6. The equivalent representation of the circuit of FIG. 2 is shown in FIG. 3. The collector of transistor Q5 is connected to the emitter e of transistor Q3 and then is connected to the collector c of transistor Q3 through the emitter-collector path of heavily conducting transistor Q3 and via capacitor C2 to ground. The transistor Q3, in other words, acts as a virtual alternating current short circuit to the signal voltage appearing at the collector of transistor Q5, and the load $R_L$ is isolated from the signal voltage, represented in FIG. 3 as the voltage generator $V_G$. It will be noted in FIG. 2 that the transistor Q3 is biased on through the forward-biased base-collector junction of transistor Q2, represented in FIG. 2 as a diode Q2' having electrodes b and c.

Referring to FIG. 1, when a positive control potential is applied to control input terminals 15 and 16, the npn transistor Q1 becomes conducting and current flows from the positive supply terminal $+V_{cc}$ through resistor R2 and a transistor Q1 to ground. The resistor R1 is a current limiting resistor for transistor Q1. When transistor Q1 becomes conducting, the voltage at the collector thereof drops almost to ground potential (ground potential less than saturation voltage of the transistor Q1) and the emitter of transistor Q2, being connected to the collector of transistor Q1, also is substantially at ground potential. The base of transistor Q2 is at a positive potential differing from ground by the relatively small potential drop across the base emitter of Q2 and the saturation voltage of Q1. A low resistance current path thus is established for current flow through the base-emitter junction of transistor Q2 to ground. At the time immediately preceding application of the control input signal, the base transistor Q3, and hence, the collector of transistor Q2, has been biased considerably positive, as explained previously, so that all current will seek the low resistance path through the base-emitter junction of transistor Q2 and there will be no current flow through the base-collector junction of transistor Q2. With no base current available at transistor Q3, this transistor is cutoff and acts as an open switch. The a-c signal still appears at the collector of transistor Q5.

Figure 4:
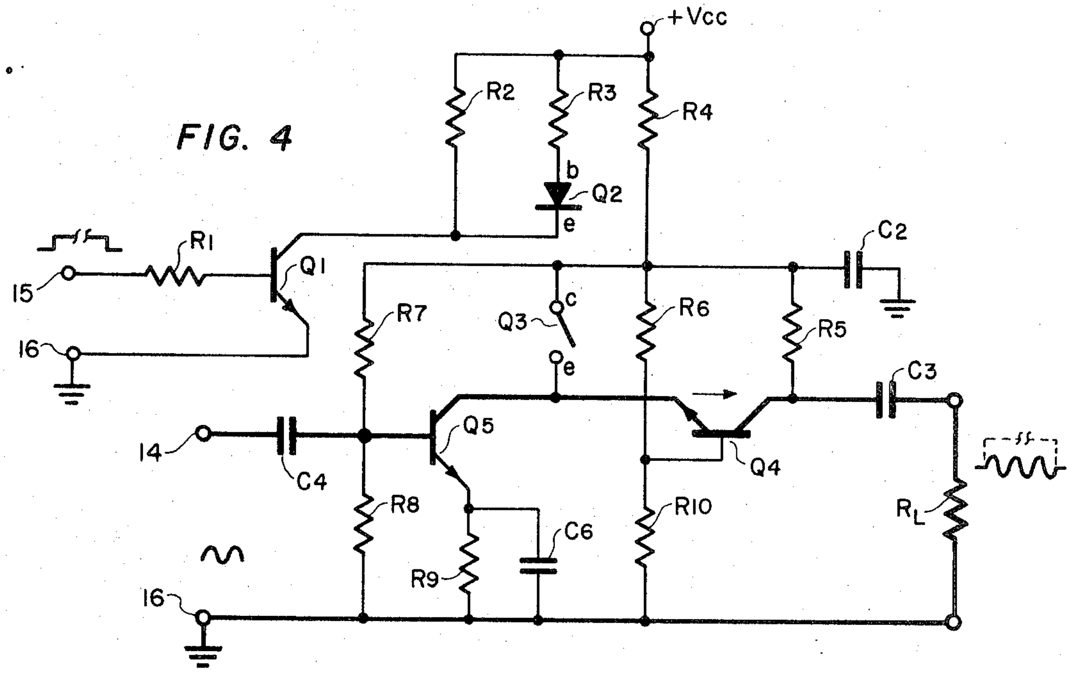
FIG. 4 is a simplified version of the circuit of FIG. 1 with a control input signal.
Figure 5:
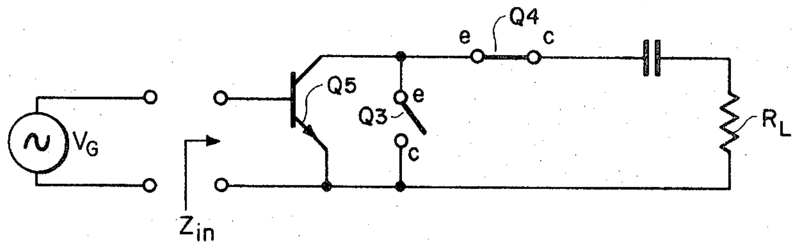
FIG. 5 is a simplified representation of the circuit illustrated in FIG. 4.

The effective signal portion of the circuit of FIG. 1, during the presence of a control input, is indicated in FIG. 4 and is shown in even more simplified form in FIG. 5. As shown, by heavy lines in FIG. 4, the alternating current signal at terminals 14 and 16 is coupled by way of capacitor C4 to the base of transistor Q5. The collector c of transistor Q5 is connected to the emitter e of transistor Q4 and the signal from the collector of transistor Q5 is connected through the emitter-collector path ec of conducting transistor Q4, which acts as a closed switch. The collector c of transistor Q4 is connected to the load $R_L$ through a coupling capacitor C3. The transistor Q3 now acts as an open switch ec, as indicated in FIG. 5. In other words, the signal which appears at the output circuit of transistor Q5 is now connected directly to the load $R_L$ through what effectively is a closed switch Q4; the other switch Q3 is now opened and no longer acts as a shunt to the signal appearing at the output circuit of transistor Q5. Resistor R5 prevents capacitor C2 from shorting the a-c signal to ground.

Figure 6:
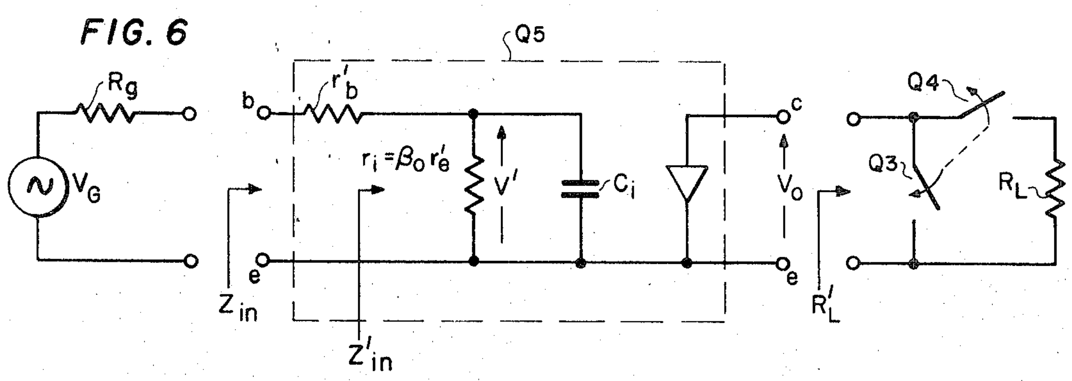
FIG. 6 illustrates, in particular, the equivalent circuit of the signal transistor used in the circuit of FIG. 1.

FIG. 6 is a representation of the circuit of FIG. 1, with the unilateral equivalent circuit for the signal transistor Q5 inclosed in dashed lines. The signal source to transistor Q5 is represented by the voltage generator $V_G$ and the internal impedance thereof is represented by $R_g$. The signal is applied between the base $b$ and emitter $e$ of transistor Q5. The base spreading resistance of transistor Q5 is indicated as $r'_b$ and the intrinsic input resistance as $r_i$; the latter is equal to the product of the small signal common emitter short circuit current gain beta at low frequency (defined here as $\beta_o$) and the diffusion resistance $r'_e$. The resistance $r'_e$ is given by $$r'_e = KT1\ qI_E \quad (1)$$

where $I_E$ is the D-C emitter bias current in amperes, $T$ is the absolute temperature in degrees Kelvin, $K$ is Boltzmann's constant $= 1.38 \times 10^{-23}$ joules/degree Kelvin and q is the electron charge $= 1.6 \times 10^{-19}$ coulombs.

The equivalent capacitance $C_i$ shown in FIG. 6 can be given by:

$$C_i \approx \frac{1 + R_L' C_c \omega_T}{r_e' \omega_T} \quad (2)$$

where $R'_L$ is the effective load resistance across Q5, as shown in FIG. 6; $C_c$ is the reverse biased collector-base junction capacitance; $\omega_T$ it the radian frequency at which the magnitude of $\beta_o$ is unity; and $r'_e$ is the diffusion resistance.

It can be seen from FIG. 6 that the input impedance, $Z_{in}$, is $$Z_{in} = R'_b + Z'_{in} \quad (3)$$

and $$Z_{in}' = \frac{r_i}{1 + j\omega_s r_i C_i} \quad (4)$$

where $\omega_S$ = signal radian frequency.

If the capacitive reactance $1/\omega_s C_i$ is much larger than $r_i$, which means that the signal frequency $$f_s \ll \frac{1}{2\pi \cdot r_i C_i},$$

then $Z'_{in}$ is approximately equal to $r_i$ and, from equation (3), the input impedance $Z_{in}$ can be given by:

$$Z_{in} \approx r'_b + r_i \approx r'_b + \beta_0 r'_e \quad (5)$$

It should be noted that the circuit of FIG. 1 has been operated successfully at a signal frequency $f_s$ of 30 MHz with an on-off power ratio of 74 db.

It has therefore been shown that the input impedance is not a function of $R'_L$ and therefore remains constant for any changes in $R'_L$. In other words, when the value of $1/\omega_s C_i$ is large compared with the value of $r_i$, a relatively large on-off power ratio, (the ratio of the power delivered to the load $R_L$ when switching transistor Q4 is closed and switching transistor Q3 is open to that delivered to the load $R_L$ when switching transistor Q3 is closed and switching transistor Q4 is open) can be achieved without any substantial change in impedance seen by the signal source.

While the invention has been described in connection with an illustrative embodiment, obvious modifications thereof are possible without departing from the spirit of the invention. Accordingly, the invention should be limited only by the scope of the appended claims.

What is claimed is:

1. In combination, a signal stage receptive of an input signal from a radio frequency source and adapted to supply a load, said signal stage having an A-C reference potential and being disposed between said source and said load for isolating the input circuit of said signal stage from changes in load impedance, a pair of switching transistors disposed in the output circuit of said signal stage and operating in complementary switching conditions, and control means for reversing the condition of both of said switching transistors, said control means including means responsive to a control input at said control means for rendering conductive a first of said switching transistors for coupling the signal in the output circuit of said signal stage to said load through said first of said switching transistors, means coupling the output of the second stage to said reference potential said control means further including means for rendering conductive the second of said switching transistors during the absence of said control input at said control means to provide an essential short circuit to said load by shunting the signal in the output circuit of said signal stage through the second of said switching transistors during the absence of said control input at said control means.

2. The combination according to claim 1 wherein said signal stage is a transistor.

3. The combination according to claim 1 wherein said first switching transistor is positioned in series with said signal stage and with said load and said second switching transistor is disposed in shunt with said signal stage.

4. The combination according to claim 1 wherein said switching transistors are connected as an emitter-coupled pair disposed in the output circuit of said signal stage.

5. The combination according to claim 4 wherein said signal stage is a transistor.

6. The combination according to claim 5 wherein the collector current of said signal stage transistor passes in alternative fashion through each of said switching transistors.

7. The combination according to claim 1 wherein said control means includes a control transistor having one diode portion only rendered conductive in response to the presence of said control input and the other diode portion only rendered conductive during the absence of said control input.

8. The combination according to claim 7 wherein said first switching transistor during conduction of said one diode portion provides a signal conductive path between said signal stage and said load.

9. The combination according to claim 7 wherein said switching transistors are connected as an emitter-coupled pair disposed in the output circuit of said signal stage.

10. The combination according to claim 7 wherein said first switching transistor is positioned in series with said signal stage and with said load and said second switching transistor is disposed in shunt with said signal stage.

11. The combination according to claim 7 wherein said second switching transistor during conduction of said other diode portion provides a conductive shunt to said signal stage to isolate said input signal from said load.

12. The combination according to claim 11 wherein said first switching transistor during conduction of said one diode portion provides a signal conductive path between said signal stage and said load.

* * * * *

PO-1050
(5/69)

UNITED STATES PATENT OFFICE
CERTIFICATE OF CORRECTION

Patent No. 3,656,002 Dated 11 April 1972

Inventor(s) RUSSELL A. GILSON et al

It is certified that error appears in the above-identified patent and that said Letters Patent are hereby corrected as shown below:

Col. 3, line 17, change equation (1) "$r'_e = KT1\ qI_E$" to -- $r'_e = \frac{KT}{qI_E}$ --.

Signed and sealed this 17th day of October 1972.

(SEAL)
Attest:

EDWARD M.FLETCHER,JR.
Attesting Officer

ROBERT GOTTSCHALK
Commissioner of Patents